(12) United States Patent
Eiraku

(10) Patent No.: US 8,973,563 B2
(45) Date of Patent: Mar. 10, 2015

(54) INTERNAL COMBUSTION ENGINE CONTROL APPARATUS

(75) Inventor: Akira Eiraku, Sunto-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 757 days.

(21) Appl. No.: 12/999,851

(22) PCT Filed: Apr. 20, 2010

(86) PCT No.: PCT/JP2010/057004
§ 371 (c)(1),
(2), (4) Date: Feb. 16, 2011

(87) PCT Pub. No.: WO2011/132264
PCT Pub. Date: Oct. 27, 2011

(65) Prior Publication Data
US 2011/0253116 A1    Oct. 20, 2011

(51) Int. Cl.
*F01L 25/00* (2006.01)
*F02D 41/32* (2006.01)
(Continued)

(52) U.S. Cl.
CPC ............ *F02D 23/02* (2013.01); *F02D 41/0007* (2013.01); *F02D 41/0235* (2013.01);
(Continued)

(58) Field of Classification Search
CPC ............... F02B 2039/164; F02B 37/18; F02D 13/0261; F02D 2200/0802; F02D 23/02; F02D 41/0007; F02D 41/0235; F02D 41/024; F02D 41/0245; F02D 41/1441; F02D 41/1446; F02D 2041/001; F02D 2041/0265; F01N 2410/02; F01N 2410/03; F01N 2560/06; F01N 2560/14; F01N 2900/1404; Y02T 10/144

USPC .............. 123/90.15, 316, 345–348, 435–436, 123/559.1, 568.14, 672, 676, 679; 701/103–105, 113; 73/114.69, 114.71, 73/114.75; 60/285, 599–603, 605.1, 280
See application file for complete search history.

(56) References Cited

U.S. PATENT DOCUMENTS 4,467,608 A * 8/1984 Matushiro et al. .............. 60/602
5,842,341 A * 12/1998 Kibe ................................ 60/274
(Continued)

FOREIGN PATENT DOCUMENTS

| DE | 2945570 A1 | 10/1980 |
|---|---|---|
| DE | 102006043670 A1 | 9/2009 |
| GB | 2038412 A | 7/1980 |
| JP | 2007-077840 A | 3/2007 |

(Continued)

*Primary Examiner* — Mahmoud Gimie
*Assistant Examiner* — John Zaleskas
(74) *Attorney, Agent, or Firm* — Kenyon & Kenyon LLP

(57) ABSTRACT

An internal combustion engine control apparatus includes means that detects an inlet temperature that is a temperature in a vicinity of an inlet of a purification catalyst disposed in an exhaust path and means that detects a turbine temperature that is a temperature in a vicinity of an exhaust turbine of a turbo-supercharger disposed in the exhaust path, and also includes means that controls a valve overlap that is a state in which an intake valve and an exhaust valve of the internal combustion engine are open simultaneously. When the inlet temperature is lower than an inlet high temperature reference value, and the turbine temperature is higher than a turbine high temperature reference value that is higher than the inlet high temperature reference value, the valve overlap amount is increased so as to be greater than a turbine high temperature time reference amount.

8 Claims, 4 Drawing Sheets

(51) Int. Cl.
*F02D 23/02* (2006.01)
*F02D 41/00* (2006.01)
*F02D 41/02* (2006.01)
*F02D 41/14* (2006.01)
*F02D 13/02* (2006.01)
*F02D 41/22* (2006.01)
*F02B 39/16* (2006.01)
*F02B 37/18* (2006.01)

(52) U.S. Cl.
CPC ........ *F02D41/1441* (2013.01); *F02D 41/1446* (2013.01); *F02D 13/0261* (2013.01); *F01N 2410/02* (2013.01); *F01N 2410/03* (2013.01); *F01N 2560/06* (2013.01); *F01N 2900/1404* (2013.01); *F02D 41/22* (2013.01); *F02D 2041/001* (2013.01); *F02D 2200/0802* (2013.01); *Y02T 10/144* (2013.01); *F02B 2039/164* (2013.01); *F02B 37/18* (2013.01); *Y02T 10/18* (2013.01)
USPC ........... 123/676; 123/90.15; 701/103; 60/602

(56) References Cited

U.S. PATENT DOCUMENTS

| | | | |
|---|---|---|---|
| 6,840,235 B2 * | 1/2005 | Koseki et al. | 123/568.14 |
| 7,249,454 B2 * | 7/2007 | Ichise et al. | 60/285 |
| 2002/0148422 A1 * | 10/2002 | Shiraishi et al. | 123/90.15 |
| 2005/0120709 A1 * | 6/2005 | Ichise et al. | 60/285 |
| 2007/0251223 A1 * | 11/2007 | Hashizume et al. | 60/299 |
| 2007/0256666 A1 | 11/2007 | Cunningham et al. | |
| 2008/0077304 A1 * | 3/2008 | Suzuki et al. | 701/102 |
| 2008/0209906 A1 * | 9/2008 | Inoue et al. | 60/605.2 |
| 2009/0070014 A1 * | 3/2009 | Miyashita | 701/105 |
| 2009/0107142 A1 * | 4/2009 | Russell et al. | 60/608 |
| 2009/0133391 A1 * | 5/2009 | Porten et al. | 60/303 |
| 2009/0266060 A1 * | 10/2009 | Guo et al. | 60/295 |
| 2009/0277431 A1 * | 11/2009 | Nitzke et al. | 123/568.12 |
| 2010/0071658 A1 * | 3/2010 | Soejima et al. | 123/406.19 |
| 2010/0312451 A1 * | 12/2010 | Karnik et al. | 701/102 |
| 2010/0313862 A1 * | 12/2010 | Lee | 123/676 |

FOREIGN PATENT DOCUMENTS

| | | |
|---|---|---|
| JP | 2007-182828 A | 7/2007 |
| JP | 2009-174393 U | 8/2009 |

* cited by examiner

INTERNAL COMBUSTION ENGINE CONTROL APPARATUS

This is a 371 national phase application of PCT/JP2010/057004 filed 20 Apr. 2010, the content of which is incorporated herein by reference.

TECHNICAL FIELD

The present invention relates to an internal combustion engine control apparatus. More specifically, the present invention relates to an internal combustion engine control apparatus equipped with a variable valve timing mechanism that is capable of variably controlling the opening characteristics of an exhaust valve or an intake valve, and a turbosupercharger.

BACKGROUND ART

An internal combustion engine control apparatus equipped with a turbosupercharger is disclosed, for example, in Patent Literature 1. According to the invention disclosed in Patent Literature 1, a waste gate valve (hereunder, referred to as "WGV") that causes a turbosupercharger to be bypassed is provided in an exhaust path of an internal combustion engine. According to the invention disclosed in Patent Literature 1, when a request to open the WGV is recognized, after opening the WGV, for example, a valve overlap amount with respect to an intake valve and an exhaust valve is increased. In contrast, when a request to close the WGV is recognized, for example, control is performed so as to close the WGV after the valve overlap amount has been decreased.

CITATION LIST

Patent Literature

Patent Literature 1: Japanese Patent Laid-Open No. 2007-182828
Patent Literature 2: Japanese Patent Laid-Open No. 2007-077840

SUMMARY OF INVENTION

Problem to be Solved by the Invention

The periphery of an exhaust turbine of a turbosupercharger is liable to reach a high temperature as the result of rotation of the turbine by exhaust gas. However, from the viewpoint of lowering costs, it is not preferable to use a material with high heat resistance for the turbine or a component at the periphery thereof (turbine or turbine housing).

A method is known that increases a fuel injection amount in order to lower the temperature of an exhaust system. By increasing the fuel injection amount, the exhaust gas temperature can be lowered by the heat of vaporization of the fuel. However, if a rich state continues with respect to the catalyst due to an excess supply of fuel, the oxygen storage amount of the catalyst will decrease and a state may be entered in which HC cannot be purified. Accordingly, an excess supply of fuel is not preferable from the viewpoint of improving exhaust emissions and improving fuel consumption.

In this respect, although the control of the degree of opening of the WGV and the control of a valve overlap amount according to the invention described in Patent Literature 1 improves a deterioration in the combustion state in a transitional period, the invention does not take the temperature of the exhaust system into consideration. For example, when the WGV is opened in a state in which a valve overlap amount has been increased, as in the aforementioned Patent Literature 1, blow-by air and unburned fuel flow through the exhaust system and, in particular, react upstream of a purification catalyst. It is considered that in such case the catalyst may overheat and deteriorate due to the heat of the reaction.

In contrast, under normal conditions, the temperature of blow-by gas is low compared to that of exhaust gas after combustion. Accordingly, it is considered that, for example, in a case where blow-by is caused during a warm-up process or the like such as when only an upstream side of a catalyst is in an active state, the catalyst temperature is reduced by the gas that enters the catalyst, and cooling occurs up to the upstream side of the catalyst. Consequently, the purification performance of the catalyst declines.

Accordingly, an object of the present invention is to solve the above problem and provide an internal combustion engine control apparatus that is improved so as to be capable of suppressing an excessively high temperature state or low temperature state at the periphery of an exhaust turbine and of a catalyst temperature, while suppressing an excessive injection of fuel.

Means for Solving the Problem

In accomplishing the above object, a first aspect of the present invention, there is provided an internal combustion engine control apparatus, comprising:

inlet temperature detection means that detects an inlet temperature that is a temperature in a vicinity of an inlet of a purification catalyst disposed in an exhaust path of an internal combustion engine;

turbine temperature detection means that detects a turbine temperature that is a temperature on an upstream side of the vicinity of the inlet of the purification catalyst, and that is a temperature in a vicinity of an exhaust turbine of a turbosupercharger disposed in the exhaust path;

overlap control means that controls a valve overlap that is a state in which an intake valve and an exhaust valve of the internal combustion engine are open at the same time;

inlet high temperature determination means that determines whether or not the inlet temperature is lower than an inlet high temperature reference value; and turbine high temperature determination means that determines whether or not the turbine temperature is higher than a turbine high temperature reference value that is higher than the inlet high temperature reference value;

wherein when it is determined that the inlet temperature is lower than the inlet high temperature reference value and it is determined that the turbine temperature is higher than the turbine high temperature reference value, the overlap control means increases a valve overlap amount so as to become greater than a turbine high temperature time reference amount.

According to a second aspect of the present invention, there is provided the internal combustion engine control apparatus as described in the first aspect, further comprising:

outlet temperature detection means that detects an outlet temperature that is a temperature in a vicinity of an outlet of the purification catalyst that is on a downstream side of the vicinity of the inlet of, the purification catalyst;

fuel increase determination means that determines whether or not the outlet temperature is higher than a fuel increase temperature reference value that is higher than inlet high temperature reference value and lower than the turbine high temperature reference value; and fuel injection amount control means that, when it is determined that the outlet temperature is higher than the fuel increase temperature reference value, increases a fuel injection amount that is supplied to the internal combustion engine.

According to a third aspect of the present invention, there is provided the internal combustion engine control apparatus as described in the first or second aspect, further comprising:

outlet temperature detection means that detects an outlet temperature that is a temperature in a vicinity of an outlet of the purification catalyst;

degree of opening detection means that detects a degree of opening of a waste gate valve that opens and closes a bypass passage that bypasses the exhaust turbine;

outlet high temperature determination means that determines whether or not the outlet temperature is higher than an outlet high temperature reference value; and degree of opening determination means that determines whether or not the degree of opening is greater than a first degree of opening reference value;

wherein:

when it is determined that the outlet temperature is higher than the outlet high temperature reference value, and it is determined that it is not recognized that the degree of opening is greater than the first degree of opening reference value, the overlap control means limits a valve overlap amount to an amount that is less than a first reference amount at a time of a high outlet temperature; and when it is determined that the outlet temperature is higher than the outlet high temperature reference value and it is determined that the degree of opening is greater than the first degree of opening reference value, the overlap control means limits the valve overlap amount to an amount that is less than a second reference amount at a time of a high outlet temperature that is less than the first reference amount at a time of a high outlet temperature.

According to a fourth aspect of the present invention, there is provided the internal combustion engine control apparatus as described in the first, second or third aspect, further comprising:

degree of opening detection means that detects a degree of opening of a waste gate valve that opens and closes a bypass passage that bypasses the exhaust turbine;

inlet low temperature determination means that determines whether or not the inlet temperature is lower than an inlet low temperature reference value that is lower than the inlet high temperature reference value;

turbine low temperature determination means that determines whether or not the turbine temperature is lower than a turbine low temperature reference value that is lower than the turbine high temperature reference value; and second degree of opening determination means that determines whether or not the degree of opening is smaller than a second degree of opening reference value;

wherein:

when it is determined that the inlet temperature is lower than the inlet low temperature reference value, it is determined that it is not recognized that the turbine temperature is lower than the turbine low temperature reference value, and it is determined that the degree of opening is less than the second degree of opening reference value, the overlap control means limits the valve overlap amount to an amount that is less than a first reference amount at a time of a low temperature; and when it is determined that the inlet temperature is lower than the inlet low temperature reference value and it is determined that the turbine temperature is lower than the turbine low temperature reference value, or it is determined that the inlet temperature is lower than the inlet low temperature reference value and it is determined that it is not recognized that the degree of opening is less than the second degree of opening reference value, the overlap control means limits the valve overlap amount to an amount that is less than a second reference amount at a time of a low temperature that is less than the first reference amount at a time of a low temperature.

According to a fifth aspect of the present invention, there is provided an internal combustion engine control apparatus, comprising:

outlet temperature detection means that detects an outlet temperature that is a temperature in a vicinity of an outlet of a purification catalyst that is disposed in an exhaust path of an internal combustion engine;

turbine temperature detection means that detects a turbine temperature that is a temperature in a vicinity of an exhaust turbine of a turbosupercharger that is disposed upstream of the purification catalyst in the exhaust path;

degree of opening detection means that detects a degree of opening of a waste gate valve that opens and closes a bypass passage that bypasses the exhaust turbine of the turbosupercharger;

overlap control means that controls a valve overlap that is a state in which an intake valve and an exhaust valve of the internal combustion engine are open at the same time;

outlet high temperature determination means that determines whether or not the outlet temperature is higher than an outlet high temperature reference value; and degree of opening determination means that determines whether or not the degree of opening is larger than a first degree of opening reference value;

wherein:

when it is determined that the outlet temperature is higher than the outlet high temperature reference value, and it is determined that it is not recognized that the degree of opening is greater than the first degree of opening reference value, the overlap control means limits a valve overlap amount to an amount that is less than a first reference amount at a time of a high outlet temperature; and when it is determined that the outlet temperature is higher than the outlet high temperature reference value and it is determined that the degree of opening is greater than the first degree of opening reference value, the overlap control means limits the valve overlap amount to an amount that is less than a second reference amount at a time of a high outlet temperature that is less than the first reference amount at a time of a high outlet temperature.

According to a sixth aspect of the present invention, there is provided an internal combustion engine control apparatus, comprising:

inlet temperature detection means that detects an inlet temperature that is a temperature in a vicinity of an inlet of a purification catalyst disposed in an exhaust path of an internal combustion engine;

turbine temperature detection means that detects a turbine temperature that is a temperature of a side that is upstream of the vicinity of the inlet, and is a temperature in a vicinity of an exhaust turbine of a turbosupercharger that is disposed in the exhaust path;

degree of opening detection means that detects a degree of opening of a waste gate valve that opens and closes a bypass passage that bypasses an exhaust turbine of the turbosupercharger that is disposed in the exhaust path;

overlap control means that controls a valve overlap that is a state in which an intake valve and an exhaust valve of the internal combustion engine are open at the same time;

inlet low temperature determination means that determines whether or not the inlet temperature is lower than an inlet low temperature reference value;

turbine low temperature determination means that determines whether or not the turbine temperature is lower than a turbine low temperature reference value; and second degree of opening determination means that determines whether or not the degree of opening is less than a second degree of opening reference value;

wherein:

when it is determined that the inlet temperature is lower than the inlet low temperature reference value, it is determined that it is not recognized that the turbine temperature is lower than the turbine low temperature reference value, and it is determined that the degree of opening is lower than the second degree of opening reference value, the overlap control means limits the valve overlap amount to an amount that is less than a first reference amount at a time of a low temperature; and when it is determined that the inlet temperature is lower than the inlet low temperature reference value and it is determined that the turbine temperature is lower than the turbine low temperature reference value, or when it is determined that the inlet temperature is lower than the inlet low temperature reference value and it is determined that it is not recognized that the degree of opening is less than the second degree of opening reference value, the overlap control means limits the valve overlap amount to an amount that is less than a second reference amount at a time of a low temperature that is less than the first reference amount at a time of a low temperature.

Advantageous Effects of Invention

According to the first invention, when a turbine temperature is higher than a predetermined turbine high temperature reference value and an inlet temperature of a purification catalyst is lower than a predetermined inlet high temperature reference value, a valve overlap amount is increased so as to become greater than a turbine high temperature time reference amount. Thus, since a blow-by amount of new air increases, the temperature of gas that is discharged to an exhaust path can be made a low temperature. Accordingly, the temperature of an exhaust turbine that has become higher than a temperature reference value can be reduced to a low temperature using low temperature blow-by gas without performing excessive fuel injection or the like.

According to the second invention, when the exhaust turbine temperature is high and the outlet temperature of a catalyst has become higher than a temperature reference value, control that increases a fuel injection amount is performed. Thus, when there is a risk that the purification catalyst will reach an excessively high temperature, exhaust gas that has become a low temperature as the result of heat of vaporization of fuel can be circulated in the exhaust path. Accordingly, it is possible to prevent the purification catalyst from reaching an excessively high temperature due to exhaust gas that has become a high temperature as the result of passing through the exhaust turbine.

According to the fifth invention or the third invention, when the outlet temperature of the purification catalyst is higher than an outlet high temperature reference value, a valve overlap amount is limited to a reference amount, and further, when a degree of opening of a waste gate valve is greater than a degree of opening reference value, the valve overlap amount is further limited to a smaller amount. Thus, by suppressing a blow-by amount when an area up to the outlet of the purification catalyst is a high temperature, it is possible to suppress a reaction at the purification catalyst between blow-by air and unreacted fuel, and an excessive increase in the temperature of the purification catalyst can be suppressed. Further, when the degree of opening of the waste gate valve is large, the amount of gas that bypasses the exhaust turbine increases. Accordingly, in such case, by further decreasing the valve overlap amount, the gas amount that passes through the exhaust turbine before arriving at the purification catalyst can be increased, and a reaction can be promoted between new air and unburned fuel at the exhaust turbine. Therefore, a reaction at the purification catalyst can be suppressed, and an excessive increase in the temperature of the purification catalyst can be suppressed.

According to the sixth invention or the fourth invention, the valve overlap amount is limited when the purification catalyst inlet temperature is low. Further, when the turbine temperature is lower than a temperature reference value or when the degree of opening of a waste gate valve is large, the valve overlap amount is limited to a still smaller amount. Thus, when the purification catalyst inlet temperature is a low temperature, it is possible to suppress a decrease in the temperature of an exhaust gas due to blow-by, and a further decrease in the purification catalyst temperature caused by low temperature gas can be prevented. Furthermore, when an exhaust turbine temperature is lower than a temperature reference value, an increase in the temperature of exhaust gas produced by passage through the exhaust turbine cannot be expected. In addition, when the degree of opening of a waste gate valve is large, since the exhaust turbine is bypassed even though the exhaust turbine may be a high temperature, an increase in the exhaust gas temperature that is caused by the exhaust turbine cannot be expected. According to the sixth or fourth invention, since a valve overlap amount is limited to a still smaller amount in such case, a decrease in the exhaust gas temperature caused by blow-by can be prevented, high temperature gas can be introduced into the purification catalyst, and a decrease in the temperature of the purification catalyst can be suppressed.

DESCRIPTION OF EMBODIMENTS

Figure 1:
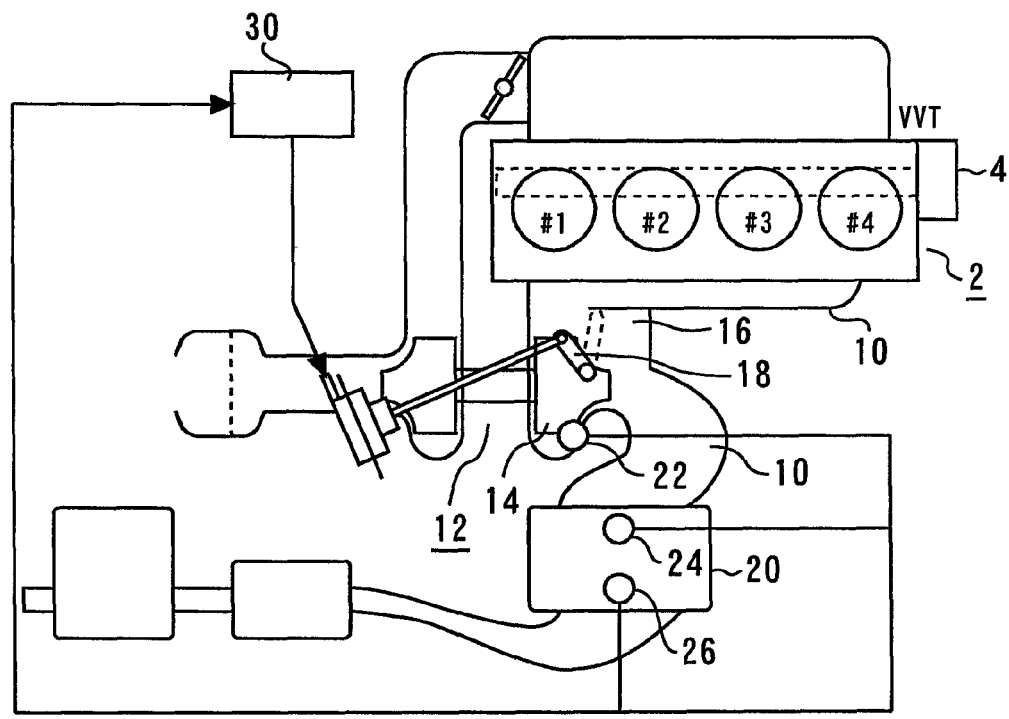
FIG. 1 is a schematic diagram for describing an internal combustion engine control apparatus and peripheral equipment thereof according to Embodiment 1 of the present invention.

Embodiments of the present invention are described hereunder with reference to the drawings. For each of the drawings, the same or corresponding components and portions are denoted by the same reference numerals, and a description of such components and portions is simplified or omitted.

Embodiment 1

FIG. 1 is a schematic diagram for describing the overall configuration of a system including an internal combustion engine control apparatus and peripheral equipment thereof according to Embodiment 1 of the present invention. The system shown in FIG. 1 includes an internal combustion engine 2. The internal combustion engine 2 has four cylinders, #1 to #4. The internal combustion engine 2 is provided with a fuel injection valve for cylinder injection of fuel which can inject fuel directly into each cylinder.

In the intake valve and exhaust valve of each cylinder of the internal combustion engine 2 is arranged a variable valve timing mechanism (VVT) 4 that changes the respective opening characteristics (open/close timing, lift amount and the like) of each valve. Various kinds of configurations and operations are known with respect to the VVT 4, and therefore a detailed description thereof is omitted here.

An exhaust port of each cylinder is connected to an exhaust path 10. An exhaust turbine 14 of a turbosupercharger 12 that compresses new air utilizing energy of exhaust gas is provided inside the exhaust path 10. A bypass portion 16 that bypasses the exhaust turbine 14 is provided in the exhaust path 10. An inlet side of the bypass portion 16 communicates with the exhaust path 10 on an upstream side of the exhaust turbine 14, and an outlet side of the bypass portion 16 communicates again with the exhaust path 10 on a downstream side of the exhaust turbine 14. A WGV 18 (waste gate valve) for opening and closing the inlet of the bypass portion 16 is provided in the vicinity of an upstream-side connecting portion that connects with the exhaust path 10 of the bypass portion 16.

A purification catalyst 20 is connected downstream of the exhaust turbine 14 in the exhaust path 10. Temperature sensors 22, 24, and 26 are arranged in the vicinity of the exhaust turbine 14 of the exhaust path 10, on the upstream side inside the purification catalyst 20, and on the downstream side inside the purification catalyst 20, respectively, for detecting the respective temperatures. The temperature sensors 22, 24, and 26 are sensors that output signals in accordance with the respective temperatures.

The control system of the internal combustion engine 2 according to Embodiment 1 is equipped with an ECU (Electronic Control Unit) 30. The ECU 30 is a control apparatus that performs integrated control of the overall system of the internal combustion engine 2. Various kinds of actuators are connected to the output side of the ECU 30. Sensors such as the temperature sensors 22, 24, and 26, a boost pressure sensor, an exhaust pressure sensor, an exhaust temperature sensor, and a knock sensor are connected to the input side of the ECU 30. The ECU 30 receives a signal from each sensor and operates each actuator in accordance with a predetermined control program. In this connection, although a large number of actuators and sensors are connected to the ECU 30, a description of such actuators and sensors is omitted in the present specification.

The control that the ECU 30 executes as a control apparatus according to Embodiment 1 includes control of the degree of opening of the WGV 18. For example, when a command is received that demands high supercharging such as when a high torque is necessary when accelerating or the like, the WGV 18 is closed. In a state in which the WGV 18 is closed, a full quantity of exhaust gas is introduced into the exhaust turbine 14 side. When a large quantity of exhaust gas is introduced into the exhaust turbine 14 in this manner, the inspired gas is supercharged at a high boost pressure by high-speed rotation of the exhaust turbine 14.

In contrast, in a state in which high supercharging is not demanded, the WGV 18 is opened to a predetermined degree of opening in accordance with the operational state thereof. In a state in which the WGV 18 is opened, a part (or the total amount) of the exhaust gas is introduced into the bypass portion 16 side to thereby bypass the exhaust turbine 14, and flows into the exhaust path 10 again on the downstream side of the exhaust turbine 14.

The control that the ECU 30 executes according to Embodiment 1 also includes control of a valve overlap amount in accordance with the temperature state of the exhaust system that is obtained based on output from the temperature sensors 22, 24, and 26. In this case, the term "valve overlap" refers to a state in which the intake valve and exhaust valve are open at the same time, and the intake port and exhaust port are open at the same time. Valve overlapping is controlled at a predetermined timing by the VVT 4 provided in each intake valve and exhaust valve of the internal combustion engine 2.

In the following description of the embodiments, for convenience, a temperature at the periphery of the exhaust turbine 14 that is detected in accordance with the output of the temperature sensor 22 is referred to as "turbine temperature", a temperature in the vicinity of the upstream side of the purification catalyst 20 that is detected in accordance with the output of the temperature sensor 24 is referred to as "inlet temperature", and a temperature in the vicinity of the downstream side of the purification catalyst 20 that is detected in accordance with the output of the temperature sensor 26 is referred to as "outlet temperature".

Figure 2:
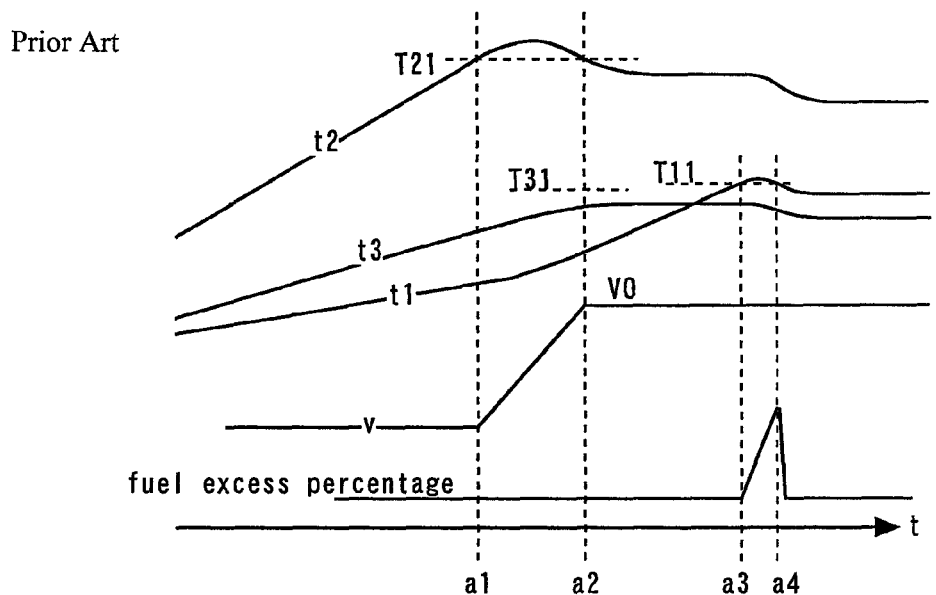
FIG. 2 is a timing chart for describing the contents of control according to Embodiment 1 of the present invention.

FIG. 2 is a timing chart for describing the contents of control of a valve overlap amount according to Embodiment 1 of the present invention. The example illustrated in FIG. 2 is control that is performed in order to lower the temperature at the periphery of the exhaust turbine 14 in a case where the temperature around the exhaust turbine 14 is a high temperature.

As shown in FIG. 2, for example, at a time a1, when a turbine temperature t2 is higher than a temperature reference value T21 (turbine high temperature reference value), and an inlet temperature t3 at this time is lower than a temperature reference value T31 (inlet high temperature reference value), a valve overlap amount v is increased until the valve overlap amount v becomes greater than a reference amount V0 (turbine high temperature time reference amount).

The valve overlap reference amount V0 is set so that a blow-by amount become sufficiently large at a timing at which blow-by occurs. When the valve overlap amount v increases to the reference amount V0, new air that has a low temperature is discharged to the exhaust path 10 together with the exhaust gas after combustion. Accordingly, low temperature gas can be made to pass through the periphery of the exhaust turbine 14, and thus the temperature at the periphery of the exhaust turbine 14 can be lowered.

Since the exhaust turbine 14 periphery is a high temperature, the temperature of the exhaust gas increases to a somewhat higher temperature as the result of passing the exhaust turbine 14. Further, since gas that is discharged as the result of the occurrence of blow-by includes unburned fuel and new air, the gas causes a reaction particularly at an upstream portion of the purification catalyst 20 from the exhaust turbine 14, and reaction heat is emitted at this time. Accordingly, as described above, control that increases the valve overlap amount v to the reference amount V0 when the turbine temperature t2 is a high temperature (>T21) is performed only when an inlet temperature t3 of the purification catalyst 20 is lower than the temperature reference value T31. It is therefore possible to suppress deterioration or damage caused by overheating of the purification catalyst 20.

In contrast, if the valve overlap amount v is increased when the inlet temperature t3 is a high temperature, the temperature in the area upstream of the purification catalyst 20 will increase further due to the heat of the gas that has passed through the exhaust turbine 14 and reached a high temperature and also due to heat generated by the reaction of unburned fuel, and it is expected that the temperature will become higher than a permissible range.

Accordingly, to avoid this situation, when the inlet temperature t3 is greater than or equal to the temperature reference value T31, the ECU 30 performs control that increases the fuel injection amount without performing control that increases the valve overlap amount v. In this case, the increased amount of the fuel injection amount is directly injected into the cylinder at a timing that is after a fuel amount is injected and burnt according to the normal air-fuel ratio control. When the fuel injection amount is increased in this manner, the temperature of the exhaust gas decreases due to the heat of vaporization of the fuel that has been injected in a large amount. By allowing this low temperature exhaust gas to circulate to the exhaust path 10, in particular the temperature at the periphery of the exhaust turbine 14 and the temperature in the vicinity of the upstream portion of the purification catalyst 20 can be reduced.

Further, when control that increases the valve overlap amount v is continued, along with the exhaust gas reaching a high temperature in the exhaust turbine 14, the temperature of the entire exhaust system gradually rises due to the reaction heat produced by reaction of unburned fuel. As a result, when overheating is recognized as far as the temperature on the downstream side of the purification catalyst 20, it is considered that the temperature of the entire purification catalyst 20 has become higher than the permissible range.

To avoid such overheating, when the outlet temperature t1 is higher than a temperature reference value T11 (fuel increase temperature reference value), as illustrated at a time a3 in the example in FIG. 2, in a state in which the valve overlap amount has been increased, the ECU 30 increases the fuel injection amount and causes the temperature of the exhaust gas to decrease. As a result, the temperature of the overall exhaust system decreases.

According to this control, the temperature reference value T21 with respect to the turbine temperature t2 is a temperature that serves as a criterion for determining whether or not to increase a blow-by amount. The temperature reference value T21 is a temperature in the vicinity of the upper limit of the heat resistant temperature of the exhaust turbine 14 and constituent members at the periphery thereof. Although a problem of damage to the exhaust turbine 14 will not be caused immediately at that temperature, the temperature of the exhaust turbine is to be lower than that temperature reference value T21. This temperature varies according to the material and shape and the like of the exhaust turbine 14 and constituent members at the periphery thereof, and is appropriately set in advance based on experiments and the like and stored in the ECU 30.

The temperature reference value T31 with respect to the inlet temperature t3 is a temperature that serves as a criterion for determining whether or not to increase the valve overlap amount. Because the temperature reference value T31 is a temperature relating to the purification catalyst 20, the temperature reference value T31 is lower than the temperature reference value T21 that relates to the exhaust turbine 14. Furthermore, although the temperature reference value T31 is a value in the vicinity of the upper limit of an appropriate active temperature range of the purification catalyst 20, the temperature reference value T31 is set with a margin that allows purification performance in the appropriate active temperature range to be maintained for a certain period even if the temperature is increased further due to an inflow of exhaust gas at a high temperature. This temperature varies according to the structure of the purification catalyst 20 and the constituent members thereof and the like, and the temperature is set in advance to an appropriate value based on experiments and the like and stored in the ECU 30.

The temperature reference value T11 with respect to the outlet temperature t1 is a temperature that serves as a criterion for determining whether or not to increase the fuel injection amount with respect to an increase in the temperature of the overall exhaust system. The temperature reference value T11 is a temperature that secures a margin with respect to a future rise in temperature in the vicinity of the upper limit of the appropriate active temperature range of the purification catalyst 20. The temperature reference value T11 is lower than the temperature reference value T21 and higher than the temperature reference value T31, and is set to an appropriate temperature based on experiments and the like similarly to the temperature reference value T31 and stored in the ECU 30.

The reference amount V0 in the case of increasing the valve overlap amount v is taken as a valve overlap amount that is large enough to be capable of prompting the occurrence of blow-by and adequately securing the blow-by amount. However, the valve timing is determined on the basis of various factors such as other operating conditions and the like, and the valve overlap amount that is set here is specified as the lower limit of the valve overlap amount at the time of executing this control. More specifically, according to the control of Embodiment 1, when a valve overlap amount that is set with another routine in the current operational state is smaller than the reference amount V0, control is performed to increase the valve overlap amount v up to the reference amount V0.

Figure 3:
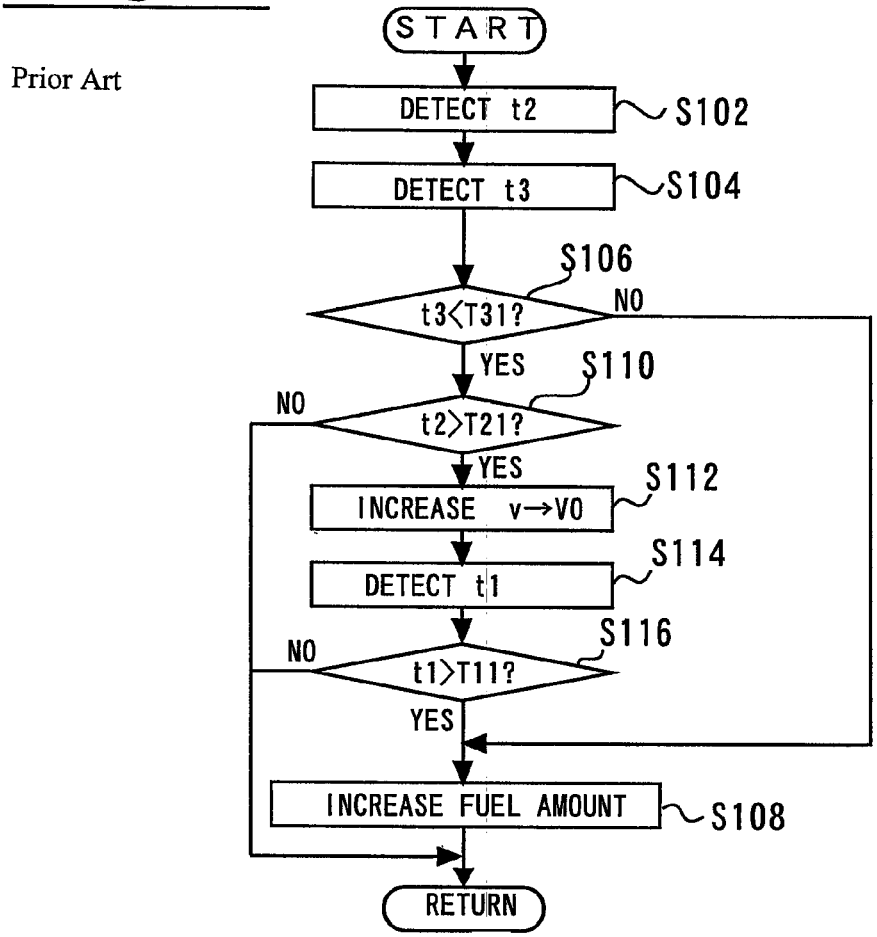
FIG. 3 is a flowchart for describing a control routine executed by the control apparatus according to Embodiment 1 of the present invention.

FIG. 3 is a flowchart for describing a control routine executed by the ECU 30 as a control apparatus according to an embodiment of the present invention. The routine shown in FIG. 3 is executed repeatedly at fixed intervals. According to the routine in FIG. 3, first the turbine temperature t2 is detected (S102). The ECU 30 uses the output of the temperature sensor 22 disposed in the vicinity of the exhaust turbine 14 as input information to detect the turbine temperature t2. Next, the input temperature t3 is detected (S104). The ECU 30 uses the output of the temperature sensor 24 disposed on the upstream side of the purification catalyst 20 as input information to detect the inlet temperature t3.

Next, the ECU 30 determines whether or not the inlet temperature t3 is lower than the temperature reference value T31 (S106). As described above, the temperature reference value T31 is a temperature that serves as a determination criterion that is previously stored in the ECU 30. When the inlet temperature t3 is a high temperature that is in excess of the temperature reference value T31, that is, when establishment of a condition t3<T31 is not recognized in step S106, the fuel injection amount is increased (S108). Thus, the exhaust gas can be made a low temperature by increasing the fuel injection amount. Thereafter, the current processing ends.

In contrast, when establishment of the condition t3<T31 is recognized in step S106, next the ECU 30 determines whether or not the turbine temperature t2 is higher than the temperature reference value T21 (S110). As described above, the temperature reference value T21 is a temperature that serves as a determination criterion that is previously stored in the ECU 30.

When establishment of a condition that the turbine temperature t2>T21 is not recognized in step S110, the ECU 30 estimates that the temperature at the periphery of the exhaust turbine 14 has not reached a temperature as high as the vicinity of the upper limit of the heat resistant temperature thereof. Accordingly, the current control state is maintained and the present processing ends.

In contrast, when establishment of the condition that the turbine temperature t2>T21 is recognized in step S110, next the valve overlap amount v is increased as far as the reference amount V0 (S112). More specifically, in this case, when a valve overlap amount v that is controlled with a different routine is less than the reference amount V0, the valve overlap amount v in question is increased up to the reference amount V0. As a result, new air can be caused to blow-by in the exhaust path 10 along with exhaust gas after burning, and the temperature at the periphery of the exhaust turbine 14 can be lowered.

Next, the outlet temperature t1 is detected (S114). The ECU 30 uses the output of the temperature sensor 26 disposed at the downstream portion of the purification catalyst 20 as input information to detect the outlet temperature t1. Subsequently, the ECU 30 determines whether or not the outlet temperature t1 is higher than the temperature reference value T11 (S116). As described above, the temperature reference value T11 is a temperature that serves as a determination criterion that is previously stored in the ECU 30.

When establishment of a condition that the outlet temperature t1>T11 is not recognized in step S116, the ECU determines that the temperatures of the downstream portion of the purification catalyst 20 and the overall exhaust system are still in a permissible range. In this case, the present processing ends in a state in which the valve overlap amount v has increased to the reference amount V0.

In contrast, when establishment of the condition that the outlet temperature t1>T11 is recognized in step S116, the fuel injection amount is increased (S108). When establishment of the condition that the outlet temperature t1>T11 is recognized, it is estimated that the section as far as the downstream side of the exhaust system has become a high temperature. Accordingly, the temperature of the exhaust gas is lowered by increasing the fuel injection amount, and thus the temperature of the overall exhaust system decreases to a low temperature. Thereafter, the current processing ends.

As described above, according to Embodiment 1, when the turbine temperature t2 is a high temperature, by increasing the valve overlap amount v it is possible to cause new air to blow-by and lower the temperature around the exhaust turbine 14. Thus, it is possible to keep the frequency of fuel injections that are performed in order to reduce the temperature low, and thereby reduce the amount of fuel used.

In this connection, when blow-by of new air is performed, the overall exhaust gas enters a lean state. When that state continues and lean exhaust gas is continuously introduced into the purification catalyst 20, the purification performance of the purification catalyst 20 may decline. At that time, the fuel injection amount can be increased so that the overall exhaust gas approaches the theoretical air fuel ratio. In that case, extra fuel is required in order to achieve the theoretical air fuel ratio. However, compared to the conventional technology that uses only the fuel injection amount to reduce the temperature, according to the method of Embodiment 1 an equivalent effect can be obtained while using less fuel.

In Embodiment 1, "turbine temperature detection means" of the present invention is realized by executing the processing of step S102, "inlet temperature detection means" is realized by executing the processing of step S104, "inlet high temperature determination means" is realized by executing the processing of step S106, "turbine high temperature determination means" is realized by executing the processing of step S110, and "overlap control means" is realized by executing the processing of step S112. Further, in Embodiment 1, "outlet temperature detection means" of the present invention is realized by executing step S114, "fuel increase determination means" is realized by executing step S116, and "fuel injection amount control means" is realized by executing step S108.

Embodiment 2

Figure 4:
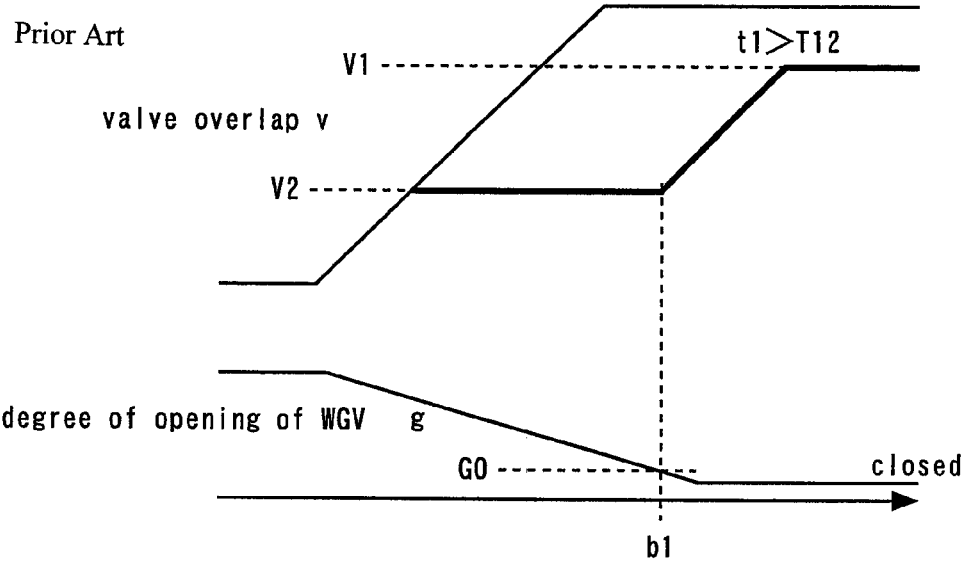
FIG. 4 is a timing chart for describing the contents of control according to Embodiment 2 of the present invention.

A system of Embodiment 2 has the same configuration as the system of Embodiment 1. FIG. 4 is a timing chart for describing the contents of control according to Embodiment 2 of the present invention. The timing chart in FIG. 4 illustrates control that is performed when the overall exhaust system, and not just the exhaust turbine 14, has reached an excessively high temperature.

More specifically, it is considered that when the outlet temperature t1 that is the temperature at the side that is furthest downstream of the exhaust system exceeds the temperature reference value T12 (outlet high temperature reference value) for a high temperature at which damage to the exhaust system is feared, the temperature of the entire purification catalyst 20 is a high temperature. If a blow-by amount increases in this state, the temperature of the purification catalyst 20 further increases due to reaction heat produced by a reaction between the blow-by air and unburned fuel, and deterioration or damage to the purification catalyst 20 can be expected.

To prevent such a situation, according to Embodiment 2, when the outlet temperature t1 is higher than the temperature reference value T12, the ECU 30 limits the valve overlap amount v to the reference amount V1 (first degree of opening reference value at time of high outlet temperature) in order to reduce the blow-by amount. Since blow-by is controlled thereby, a temperature increase caused by a reaction between unburned fuel and new air in the exhaust system can be inhibited.

When the WGV 18 is controlled more to the open side than a degree of opening reference value G0 (first degree of opening reference value) at this time (before the b1 time point in FIG. 4), the amount of exhaust gas flowing into the exhaust turbine 14 is small since most of the exhaust gas passes through the bypass portion 16. More specifically, there is an increase in the amount of reaction gas that flows into the purification catalyst 20 without passing through the exhaust turbine 14. In this case, when the exhaust gas is a comparatively high temperature, the temperature decreases upon rotating the exhaust turbine 14 and heat is released by the complex shape of the exhaust turbine 14. Accordingly, the exhaust gas can be made a low temperature by allowing a large amount of gas to pass through the exhaust turbine 14. Therefore, when the amount of gas that bypasses the exhaust turbine 14 is large, a decrease in the exhaust gas temperature produced by passage through the exhaust turbine 14 cannot be expected.

Accordingly, in a case where the WGV 18 is open more than the degree of opening reference value G0 when the downstream side of the exhaust system is a high temperature (when t1>T12), the ECU 30 limits the valve overlap amount v to a reference amount V2 that is smaller than the reference amount V1 (second reference amount at a time of a high outlet temperature). As a result, the blow-by amount decreases further, and an increase in the temperature of the exhaust system caused by the heat of reaction between fuel and new air is suppressed.

In this control, the temperature reference value T12 with respect to the outlet temperature t1 is a temperature that serves as a criterion for determining whether or not to suppress the valve overlap amount v. The temperature reference value T12 is a higher temperature than the temperature reference value T31 that serves as a determination criterion with respect to the inlet temperature of the purification catalyst 20 according to Embodiment 1. Further, the temperature reference value T12 is a temperature in the vicinity of the upper limit of the active temperature of the purification catalyst 20 and with respect to which a margin is secured so that the temperature is lower than a high temperature at which there is a fear of damage to the exhaust system or a decline in the purification performance of the purification catalyst 20. This temperature varies depending on the material used to make the purification catalyst 20 and the shape thereof, and is appropriately set in advance based on experiments and the like and stored in the ECU 30.

The reference amounts V1 and V2 in the case of decreasing the valve overlap amount v, and the degree of opening reference value G0 with respect to the degree of opening g of the WGV 18 that serves as a determination criterion for the reference amounts V1 and V2 vary depending on the operating conditions, the amount of heat release at the exhaust turbine 14, the amount of temperature decrease, and the structure of the bypass portion 16 and the like. The reference amounts V1 and V2 are appropriately set by determining effective values by experiment and the like so that an increase in the temperature of the exhaust system can be reduced, based on the relation with the degree of opening reference value G0 of the WGV 18, and the values are stored in the ECU 30.

However, the valve timing is determined on the basis of various factors such as other operating conditions and the like. The reference amounts V1 and V2 for valve overlap set in this case are determined as the upper limit of the valve overlap amount when executing the control according to Embodiment 2. More specifically, according to the control of Embodiment 2, when a valve overlap amount that is set with another routine in the current operational state is greater than the reference amount V1 or V2, control is performed that limits the valve overlap amount v to the reference amount V1 or V2.

Figure 5:
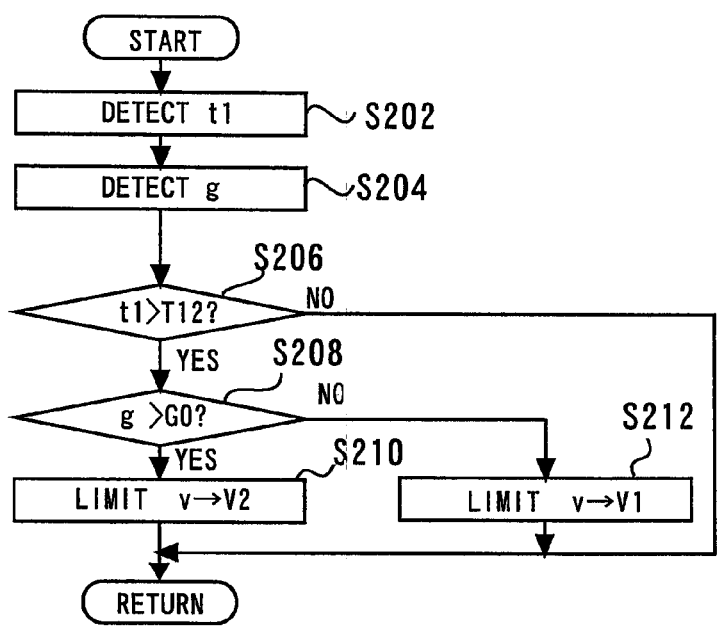
FIG. 5 is a flowchart for describing a control routine executed by a control apparatus according to Embodiment 2 of the present invention.

FIG. 5 is a flowchart for describing a control routine executed by the ECU 30 according to Embodiment 2 of the present invention. According to the routine illustrated in FIG. 5, first the outlet temperature t1 is detected (S202). Next, the current degree of opening of the WGV 18 is detected (S204). The degree of opening of the WGV 18 is determined according to the output of a degree of opening sensor (not shown) mounted in the WGV 18.

Next, the ECU 30 determines whether or not the outlet temperature t1 is higher than the temperature reference value T12 (S206). The temperature reference value T12 is a value that serves as a determination criterion that is previously set as described above and stored in the ECU 30. When establishment of a condition that the outlet temperature t1>T12 is not recognized in step S206, since it can be determined that the current temperature is of a degree at which there is no fear of exhaust system damage, the current processing ends.

In contrast, when establishment of the condition that the outlet temperature t1>T12 is recognized in step S206, next the ECU 30 determines whether or not the degree of opening of the WGV 18 is greater than the degree of opening reference value G0 (S208). In this case, the degree of opening reference value G0 serves as a determination criterion that is previously stored in the ECU 30 as described above.

When establishment of a condition that the degree of opening g>G0 is recognized in step S208, it is considered that a large amount of gas circulates through the bypass portion 16 without passing through the exhaust turbine 14. In this case, the temperature of the gas that arrives at the purification catalyst 20 is high, and there is the risk that the temperature of the purification catalyst 20 will further increase due to the generation of reaction heat at the purification catalyst 20. Accordingly, in this case the valve overlap amount is limited to the reference amount V2 (<V1) (S210). Here, V2 is a value that is stored in the ECU 30 as the smallest limit value according to the control of Embodiment 2. By controlling the valve overlap amount v so as to be a small amount in this manner, it is possible to make a blow-by amount a small amount and prevent heat generation caused by reaction of exhaust gas in the vicinity of the purification catalyst 20. Thus, overheating of the purification catalyst 20 can be suppressed.

In contrast, when establishment of the condition that the degree of opening g>G0 is not recognized in step S208, it is considered that a large amount of gas is introduced into the exhaust turbine 14. In this case, reaction of blow-by gas is promoted in the vicinity of the exhaust turbine 14 and a decrease in the temperature of the exhaust gas at the exhaust turbine 14 is expected to a certain extent. Accordingly, the valve overlap amount v in this case is controlled so as to be the reference amount V1 that is greater than the aforementioned reference amount V2 (S212). It is thereby possible to inhibit a reaction at the purification catalyst 20 that is downstream of the exhaust turbine 14 and suppress overheating of the purification catalyst 20.

As described in the foregoing, even in the case of a temperature state in which damage to the exhaust system can occur, a rise in the temperature thereof can be inhibited by controlling the valve overlap amount v while taking into consideration the degree of opening of the WGV 18.

In Embodiment 2, "outlet temperature detection means" of the present invention is realized by executing the processing of step S202, "degree of opening detection means" is realized by executing the processing of step S204, "outlet high temperature determination means" is realized by executing the processing of step S206, "degree of opening determination means" is realized by executing the processing of step S208, and "overlap control means" is realized by executing the processing of step S210 or S212.

Embodiment 3

Figure 6:
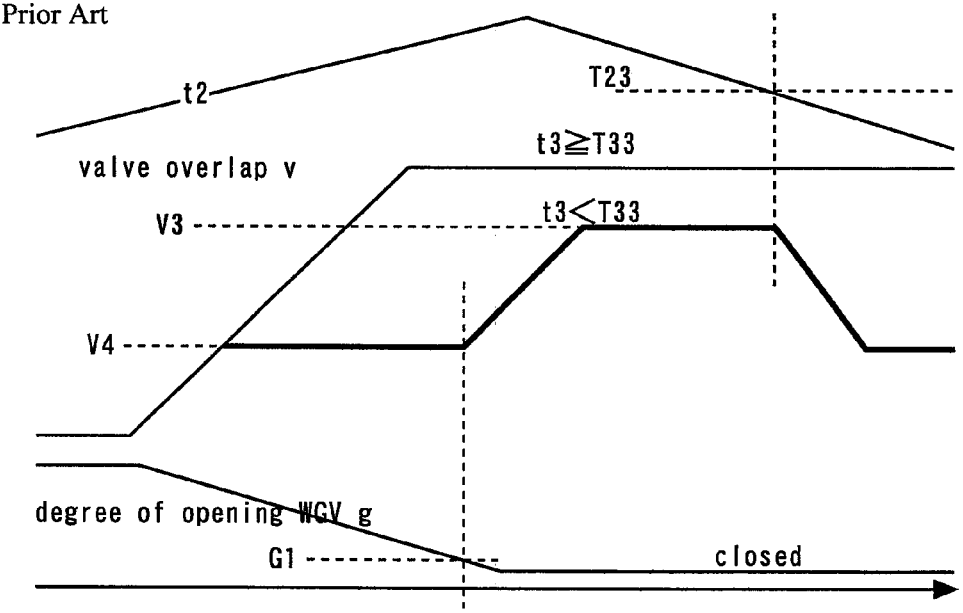
FIG. 6 is a timing chart for describing the contents of control according to Embodiment 3 of the present invention.

FIG. 6 is a timing chart for describing the contents of control according to Embodiment 3 of the present invention. The control contents illustrated in FIG. 6 represent control that is executed when the temperature of the purification catalyst 20 has decreased to the extent that there is a risk that the purification performance will decline.

For example, in a case where the inlet temperature of the purification catalyst 20 is a low temperature in the vicinity of the lower limit of the active temperature range, such as during a warm-up process, a decline in the purification performance of the purification catalyst 20 can be expected. Further, it is considered that under such an environment the temperature of the entire exhaust system including the exhaust turbine 14 is low. If a blow-by amount is increased under this kind of low temperature environment, it can be expected that new blow-by air at a low temperature will cause, in particular, the temperature of the upstream portion of the purification catalyst 20 to fall further to a low temperature.

Accordingly, as shown in FIG. 6, when the inlet temperature t3 is lower than a temperature reference value T33, the ECU 30 of Embodiment 3 reduces the blow-by amount by limiting the valve overlap amount v to a smaller reference amount V3, and thereby makes the temperature of exhaust gas discharged to the exhaust path 10 reach a comparatively high temperature.

Further, when the degree of opening g of the WGV 18 is large, there is an increase in the amount of gas that passes through the bypass portion 16 and is introduced to the purification catalyst 20 without passing through the exhaust turbine 14. In this case, low temperature exhaust gas flows directly into the purification catalyst 20 as it is, without the temperature thereof increasing at the exhaust turbine 14 or the like.

To inhibit the occurrence of such a state, when the degree of opening of the WGV 18 is greater than a degree of opening reference value G1 (second degree of opening reference value), the ECU 30 limits the valve overlap amount v to a reference amount V4 (second reference amount at a time of a low temperature) that is less that the aforementioned V3. By limiting the valve overlap amount v to the smaller amount V4 in this manner, the exhaust gas discharged into the exhaust path 10 is made a high temperature, and the inflow of low temperature gas to the upstream portion of the purification catalyst 20 is suppressed.

Similarly, when the turbine temperature t2 is a low temperature, even if the gas amount passing through the exhaust turbine 14 increases, an increase in the temperature of the exhaust gas as the result of passing through the exhaust turbine 14 cannot be expected, and gas discharged due to blow-by occurring can be expected to flow into the purification catalyst 20 as it is at a low temperature.

To avoid this situation, when the turbine temperature t2 is lower than a temperature reference value T23 (turbine low temperature reference value), the ECU 30 limits the valve overlap amount v to the reference amount V4 that is less than the reference amount V3.

In the above described control, the temperature reference value T33 with respect to the inlet temperature t3 is a temperature reference value for determining whether or not the temperature of the purification catalyst 20 is a low temperature of a degree such that there is a risk that the purification performance will deteriorate. Although the temperature reference value T33 is a temperature in the vicinity of the lower limit of the active temperature range of the purification catalyst 20, the temperature reference value T33 is a temperature in a permissible range that, in order to secure a margin of a certain amount, is set higher than a low temperature region at which there is the risk of a deterioration in the purification performance. This temperature is previously determined based on experiments and the like, and is stored in the ECU 30.

The temperature reference value T23 with respect to the turbine temperature t2 is a temperature reference value that serves as a reference for determining whether to make the limit amount of the valve overlap amount v either the reference amount V3 or the reference amount V4. In this case, the temperature reference value T23 is set to a sufficiently low temperature compared to the temperature reference value T21 according to Embodiment 1. The temperature reference value T23 is a value in the vicinity of a boundary value for determining whether or not the temperature is of a degree whereby the temperature of gas can increase to some extent by passing through the exhaust turbine 14, even if the blow-by amount increases and low temperature gas is introduced thereto. The temperature reference value T23 varies depending on various factors such as the performance of the purification catalyst 20, the degree of opening reference value G1 of the WGV 18, the reference amounts V3 and V4, and the structure of the exhaust turbine 14, and is appropriately set in advance based on experiments and the like and stored in the ECU 30.

The reference amounts V3 and V4, and the degree of opening reference value G1 with respect to the degree of opening g of the WGV 18 that serves as a criterion for determining the reference amounts V3 and V4 vary depending on the operating conditions, the amount of heat release at the exhaust turbine 14, the amount of temperature decrease, and the structure of the bypass portion 16 and the like. The reference amounts V3 and V4 are appropriately set by determining effective values by experiment and the like so that a decrease in the temperature of the exhaust system can be suppressed, based on the relation with the degree of opening G1 of the WGV 18, and the values are stored in the ECU 30.

Figure 7:
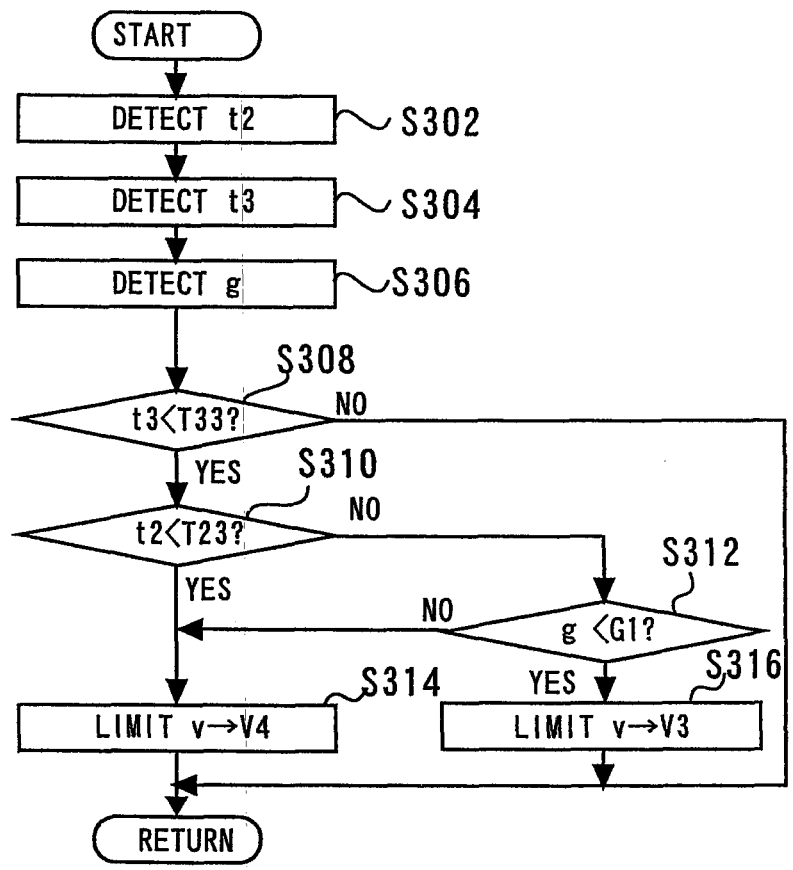
FIG. 7 is a flowchart for describing a control routine executed by a control apparatus according to Embodiment 3 of the present invention.

FIG. 7 is a flowchart for describing a control routine executed by the system according to Embodiment 3 of the present invention. According to the routine illustrated in FIG. 7, first the turbine temperature t2 and the inlet temperature t3 are detected (S302, S304). Next, the degree of opening g of the WGV 18 is detected (S306).

Subsequently, it is determined whether or not the inlet temperature t3 is lower than the temperature reference value T33 (S308). The temperature reference value T33 is a value that serves as a determination criterion that is previously stored in the ECU 30. Here, when establishment of a condition that the inlet temperature t3<T33 is not recognized, it is determined that there is no risk of a decline in the purification performance of the purification catalyst 20 due to a low temperature, and hence the current processing ends.

In contrast, when establishment of the condition that the inlet temperature t3<T33 is recognized in step S308, next it is determined whether or not the turbine temperature t2 is lower than the temperature reference value T23 (S310). The temperature reference value T23 is a value that serves as a determination criterion that is previously stored in the ECU 30.

When establishment of a condition that the turbine temperature t2<T23 is not recognized in step S310, next it is determined whether or not the degree of opening g of the WGV 18 is smaller than the degree of opening reference value G1 (S312). The degree of opening reference value G1 is a value that serves as a determination criterion that is previously stored in the ECU 30.

When establishment of the condition that the turbine temperature t2<T23 is recognized in step S310, or when establishment of a condition that the WGV 18 degree of opening g<G1 is not recognized in step S312, it is determined that the state is one in which it is not possible to expect a sufficient temperature increase in the exhaust gas caused by passage thereof through the exhaust turbine 14 because the exhaust turbine 14 is at a low temperature, or it is determined that even though the exhaust turbine 14 temperature is equal to or greater than the temperature reference value T23, the state is one in which there is a risk that exhaust gas will flow as it is at a low temperature into the purification catalyst 20 because the amount of gas bypassing the exhaust turbine 14 is large. Accordingly, in these cases, the valve overlap amount v is limited to the smallest reference amount V4 for this control (S314). Thereafter, the current processing ends.

In contrast, when establishment of the condition that the turbine temperature t2<T23 is not recognized in step S310, or when establishment of the condition that the WGV 18 degree of opening g<G1 is recognized in step S312, the temperature of the exhaust gas is increased to some extent by passing through, and not bypassing, the exhaust turbine 14 that is at a comparatively high temperature. Accordingly, in this case, the valve overlap amount is limited to the reference amount V3 (>V4) (S316).

Thus, when the purification catalyst 20 is at a low temperature and there is a risk of a decline in the purification performance, it is possible to suppress a temperature decrease at the purification catalyst 20 and maintain the purification performance of the purification catalyst 20 by controlling the valve overlap amount.

In Embodiment 3, "turbine temperature detection means" of the present invention is realized by executing the processing of step S302, "inlet temperature detection means" is realized by executing the processing of step S304, "degree of opening detection means" of the present invention is realized by executing the processing of step S306, "inlet low temperature determination means" is realized by executing the processing of step S308, "turbine low temperature determination means" is realized by executing the processing of step S310, "second degree of opening determination means" is realized by executing the processing of step S312, and "overlap control means" is realized by executing the processing of step S314 or S316.

In this connection, even when the number, quantity, amount, range or other numerical attribute of an element is mentioned in the above description of the embodiments, the present invention is not limited to the mentioned numerical attribute unless it is expressly stated or theoretically defined. Further, structures and the like described in conjunction with the embodiments are not necessarily essential to the present invention unless expressly stated or theoretically defined.

DESCRIPTION OF NOTATIONS 2 internal combustion engine
4 VVT
10 exhaust path
12 turbosupercharger
14 exhaust turbine
16 bypass portion
18 WGV
20 purification catalyst
22, 24, 26 temperature sensor

The invention claimed is:

1. An internal combustion engine control apparatus, comprising:
an inlet temperature detection device that detects an inlet temperature that is a temperature in a vicinity of an inlet of a purification catalyst disposed in an exhaust path of an internal combustion engine;
a turbine temperature detection device that detects a turbine temperature that is a temperature on an upstream side of the vicinity of the inlet of the purification catalyst, and that is a temperature in a vicinity of an exhaust turbine of a turbo-supercharger disposed in the exhaust path;
an overlap control device that controls a valve overlap that is a state in which an intake valve and an exhaust valve of the internal combustion engine are open at the same time;
an inlet high temperature determination device that determines whether or not the inlet temperature is lower than an inlet high temperature reference value; and
a turbine high temperature determination device that determines whether or not the turbine temperature is higher than a turbine high temperature reference value that is higher than the inlet high temperature reference value;
wherein when it is determined that the inlet temperature is lower than the inlet high temperature reference value and it is determined that the turbine temperature is higher than the turbine high temperature reference value, the overlap control device increases a valve overlap amount so as to become greater than a turbine high temperature time reference amount, and when it is determined that the inlet temperature is higher than the inlet high temperature reference value and it is determined that the turbine temperature is higher than the turbine high temperature reference value, fuel injection amount that is supplied to the internal combustion engine is increased without increasing the valve overlap amount.

2. The internal combustion engine control apparatus according to claim 1, further comprising:
an outlet temperature detection device that detects an outlet temperature that is a temperature in a vicinity of an outlet of the purification catalyst that is on a downstream side of the vicinity of the inlet of the purification catalyst;
a fuel increase determination device that determines whether or not the outlet temperature is higher than a fuel increase temperature reference value that is higher than the inlet high temperature reference value and lower than the turbine high temperature reference value; and
a fuel injection amount control device that, when it is determined that the outlet temperature is higher than the fuel increase temperature reference value, increases a fuel injection amount that is supplied to the internal combustion engine.

3. The internal combustion engine control apparatus according to claim 2, further comprising:
a degree of opening detection device that detects a degree of opening of a waste gate valve that opens and closes a bypass passage that bypasses the exhaust turbine;
an outlet high temperature determination device that determines whether or not the outlet temperature is higher than an outlet high temperature reference value; and
a degree of opening determination device that determines whether or not the degree of opening is greater than a first degree of opening reference value;
wherein:
when it is determined that the outlet temperature is higher than the outlet high temperature reference value, and it is determined that it is not recognized that the degree of opening is greater than the first degree of opening reference value, the overlap control device limits the valve overlap amount to an amount that is less than a first reference amount at a time of a high outlet temperature; and
when it is determined that the outlet temperature is higher than the outlet high temperature reference value and it is determined that the degree of opening is greater than the first degree of opening reference value, the overlap control device limits the valve overlap amount to an amount that is less than a second reference amount at a time of a high outlet temperature that is less than the first reference amount at a time of a high outlet temperature.

4. The internal combustion engine control apparatus according to claim 1, further comprising:

an outlet temperature detection device that detects an outlet temperature that is a temperature in a vicinity of an outlet of the purification catalyst;
a degree of opening detection device that detects a degree of opening of a waste gate valve that opens and closes a bypass passage that bypasses the exhaust turbine;
an outlet high temperature determination device that determines whether or not the outlet temperature is higher than an outlet high temperature reference value; and
a degree of opening determination device that determines whether or not the degree of opening is greater than a first degree of opening reference value;
wherein:
when it is determined that the outlet temperature is higher than the outlet high temperature reference value, and it is determined that it is not recognized that the degree of opening is greater than the first degree of opening reference value, the overlap control device limits the valve overlap amount to an amount that is less than a first reference amount at a time of a high outlet temperature; and
when it is determined that the outlet temperature is higher than the outlet high temperature reference value and it is determined that the degree of opening is greater than the first degree of opening reference value, the overlap control device limits the valve overlap amount to an amount that is less than a second reference amount at a time of a high outlet temperature that is less than the first reference amount at a time of a high outlet temperature.

5. The internal combustion engine control apparatus according to claim 2, further comprising:
a degree of opening detection device that detects a degree of opening of a waste gate valve that opens and closes a bypass passage that bypasses the exhaust turbine;
an inlet low temperature determination device that determines whether or not the inlet temperature is lower than an inlet low temperature reference value that is lower than the inlet high temperature reference value;
a turbine low temperature determination device that determines whether or not the turbine temperature is lower than a turbine low temperature reference value that is lower than the turbine high temperature reference value; and
a degree of opening determination device that determines whether or not the degree of opening is smaller than a degree of opening reference value;
wherein:
when it is determined that the inlet temperature is lower than the inlet low temperature reference value, it is determined that it is not recognized that the turbine temperature is lower than the turbine low temperature reference value, and it is determined that the degree of opening is less than the degree of opening reference value, the overlap control device limits the valve overlap amount to an amount that is less than the first reference amount at a time of a low temperature; and
when it is determined that the inlet temperature is lower than the inlet low temperature reference value and it is determined that the turbine temperature is lower than the turbine low temperature reference value, or it is determined that the inlet temperature is lower than the inlet low temperature reference value and it is determined that it is not recognized that the degree of opening is less than the degree of opening reference value, the overlap control device limits the valve overlap amount to an amount that is less than the second reference amount at a time of a low temperature that is less than the first reference amount at a time of a low temperature.

6. The internal combustion engine control apparatus according to claim 4, further comprising:
an inlet low temperature determination device that determines whether or not the inlet temperature is lower than an inlet low temperature reference value that is lower than the inlet high temperature reference value;
a turbine low temperature determination device that determines whether or not the turbine temperature is lower than a turbine low temperature reference value that is lower than the turbine high temperature reference value; and
a second degree of opening determination device that determines whether or not the degree of opening is smaller than a second degree of opening reference value;
wherein:
when it is determined that the inlet temperature is lower than the inlet low temperature reference value, it is determined that it is not recognized that the turbine temperature is lower than the turbine low temperature reference value, and it is determined that the degree of opening is less than the second degree of opening reference value, the overlap control device limits the valve overlap amount to an amount that is less than the first reference amount at a time of a low temperature; and
when it is determined that the inlet temperature is lower than the inlet low temperature reference value and it is determined that the turbine temperature is lower than the turbine low temperature reference value, or it is determined that the inlet temperature is lower than the inlet low temperature reference value and it is determined that it is not recognized that the degree of opening is less than the second degree of opening reference value, the overlap control device limits the valve overlap amount to an amount that is less than the second reference amount at a time of a low temperature that is less than the first reference amount at a time of a low temperature.

7. The internal combustion engine control apparatus according to claim 3, further comprising:
an inlet low temperature determination device that determines whether or not the inlet temperature is lower than an inlet low temperature reference value that is lower than the inlet high temperature reference value;
a turbine low temperature determination device that determines whether or not the turbine temperature is lower than a turbine low temperature reference value that is lower than the turbine high temperature reference value; and
a second degree of opening determination device that determines whether or not the degree of opening is smaller than a second degree of opening reference value;
wherein:
when it is determined that the inlet temperature is lower than the inlet low temperature reference value, it is determined that it is not recognized that the turbine temperature is lower than the turbine low temperature reference value, and it is determined that the degree of opening is less than the second degree of opening reference value, the overlap control device limits the valve overlap amount to an amount that is less than the first reference amount at a time of a low temperature; and
when it is determined that the inlet temperature is lower than the inlet low temperature reference value and it is determined that the turbine temperature is lower than the turbine low temperature reference value, or it is determined that the inlet temperature is lower than the inlet low temperature reference value and it is determined that it is not recognized that the degree of opening is less than the second degree of opening reference value, the overlap control device limits the valve overlap amount to an amount that is less than the second reference amount at a time of a low temperature that is less than the first reference amount at a time of a low temperature.

8. The internal combustion engine control apparatus according to claim 1, further comprising:
- a degree of opening detection device that detects a degree of opening of a waste gate valve that opens and closes a bypass passage that bypasses the exhaust turbine;
- an inlet low temperature determination device that determines whether or not the inlet temperature is lower than an inlet low temperature reference value that is lower than the inlet high temperature reference value;
- a turbine low temperature determination device that determines whether or not the turbine temperature is lower than a turbine low temperature reference value that is lower than the turbine high temperature reference value; and
- a second degree of opening determination device that determines whether or not the degree of opening is smaller than a second degree of opening reference value;

wherein:
when it is determined that the inlet temperature is lower than the inlet low temperature reference value, it is determined that it is not recognized that the turbine temperature is lower than the turbine low temperature reference value, and it is determined that the degree of opening is less than the second degree of opening reference value, the overlap control device limits the valve overlap amount to an amount that is less than a first reference amount at a time of a low temperature; and when it is determined that the inlet temperature is lower than the inlet low temperature reference value and it is determined that the turbine temperature is lower than the turbine low temperature reference value, or it is determined that the inlet temperature is lower than the inlet low temperature reference value and it is determined that it is not recognized that the degree of opening is less than the second degree of opening reference value, the overlap control means limits the valve overlap amount to an amount that is less than a second reference amount at a time of a low temperature that is less than the first reference amount at a time of a low temperature.

* * * * *